United States Patent Office 2,740,978
Patented Apr. 10, 1956

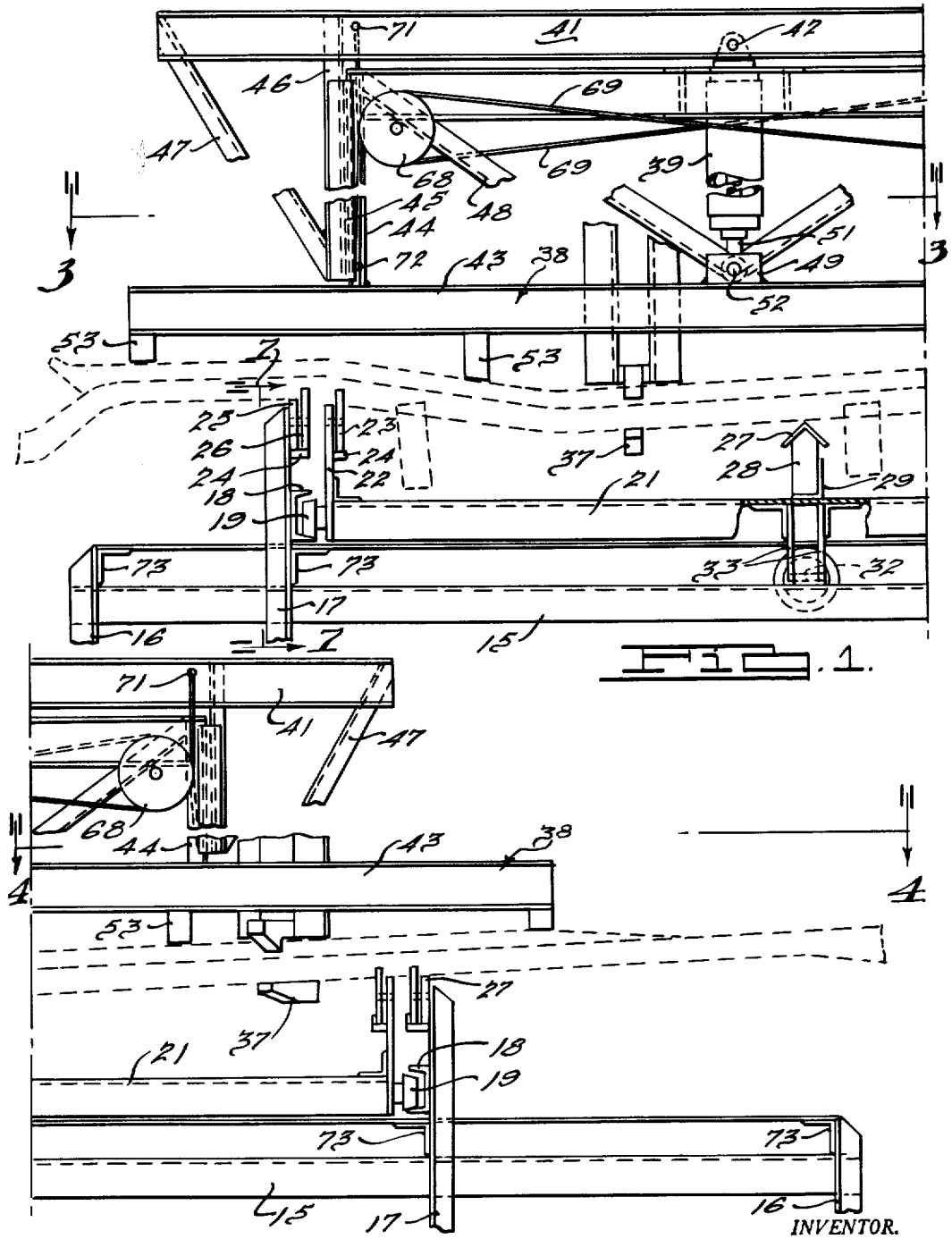

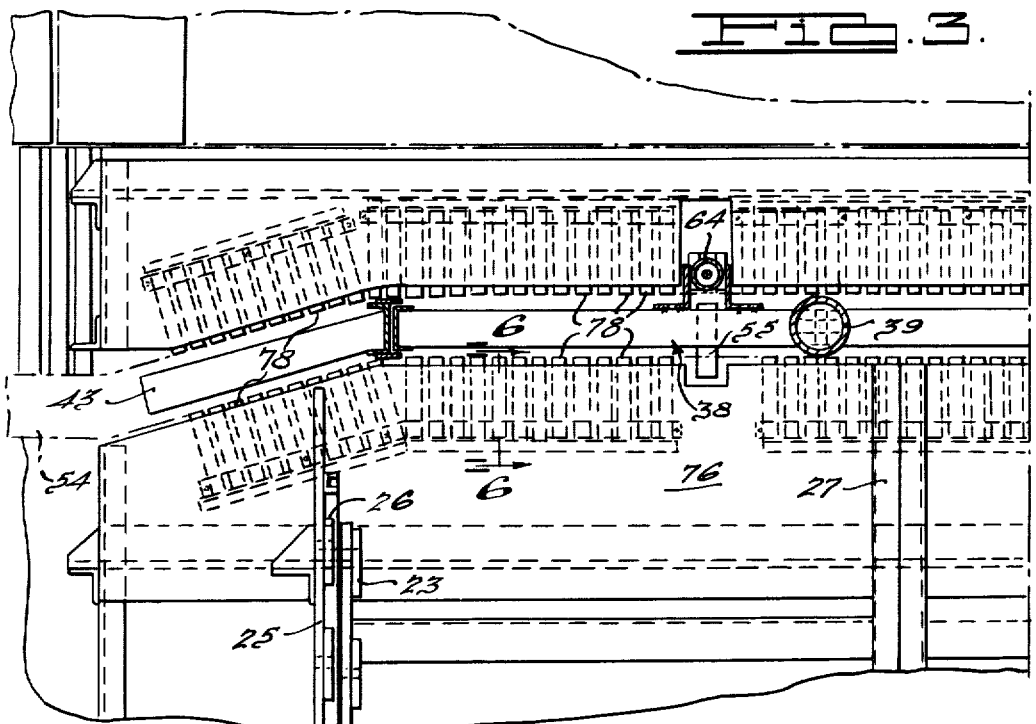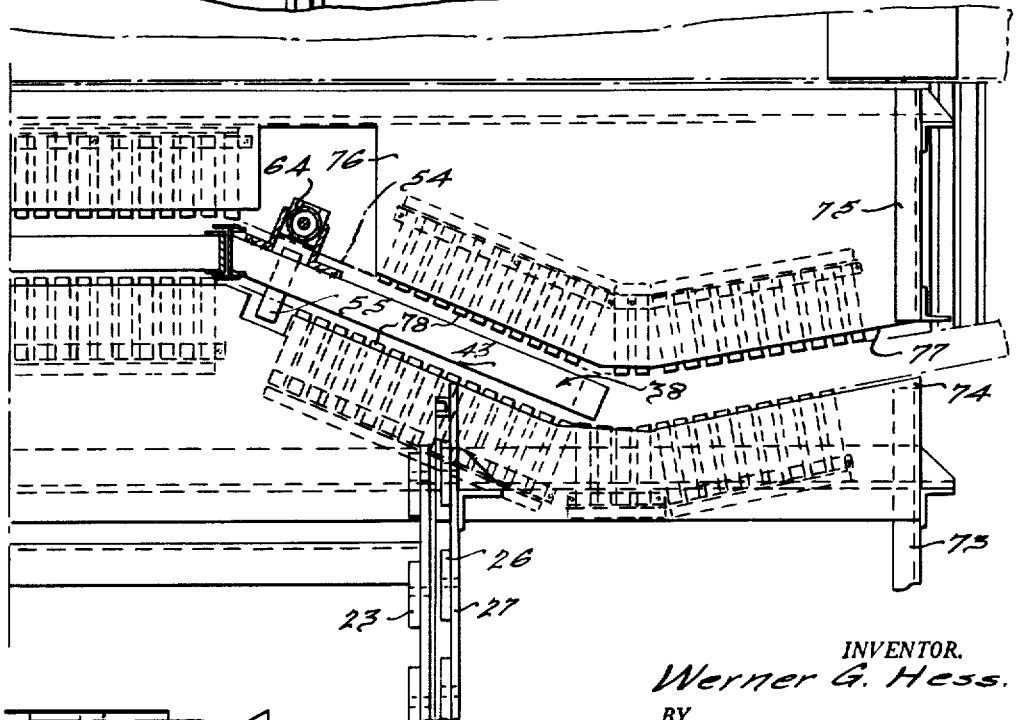

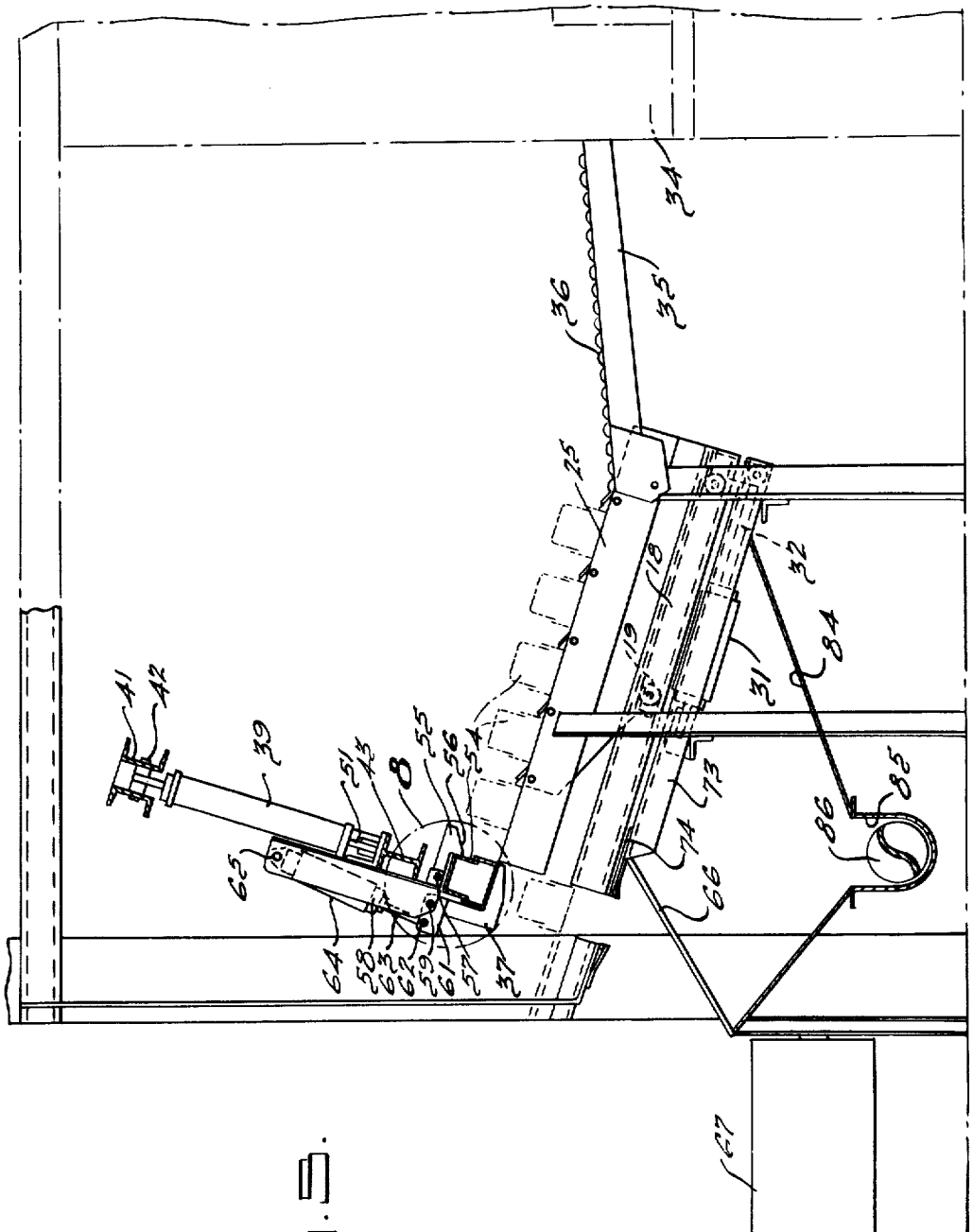

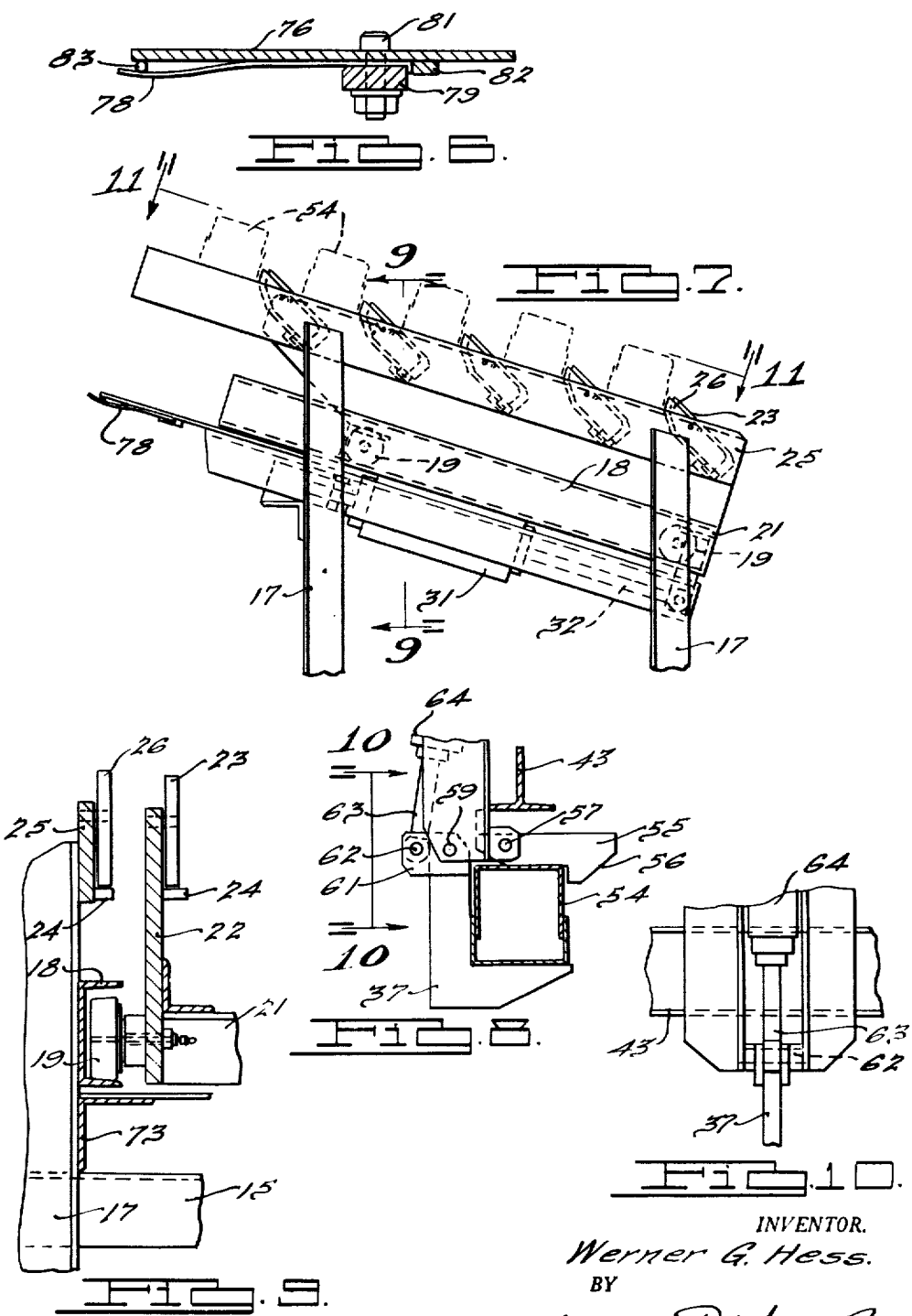

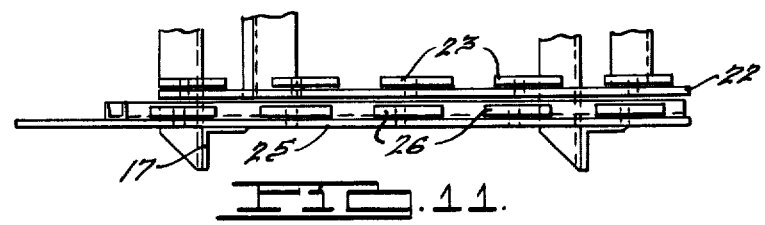
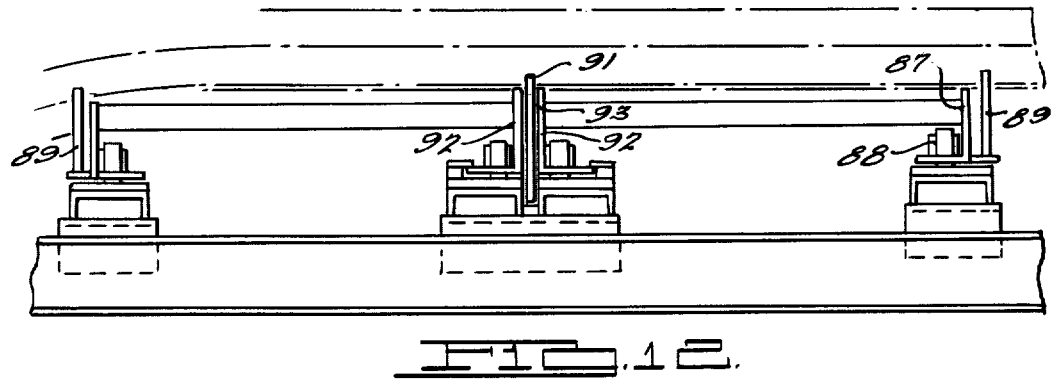
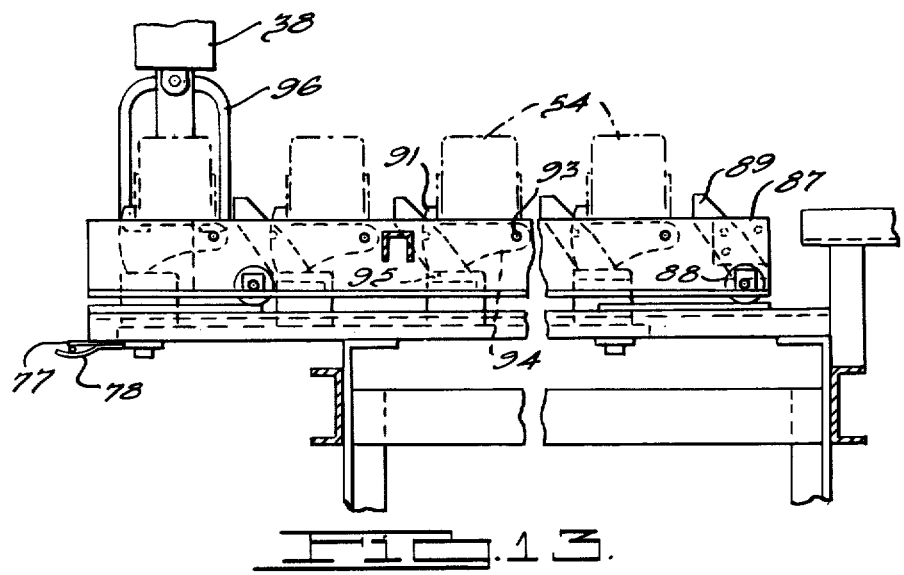

2,740,978
DEVICE FOR REMOVING FLUX FROM WELDED SEAM

Werner G. Hess, Dearborn, Mich., assignor, by mesne assignments, to Dana Corporation, Toledo, Ohio, a corporation of Virginia Application January 30, 1953, Serial No. 334,336

6 Claims. (Cl. 15—93)

This invention relates to machines for removing flux from welds, and particularly to a machine for removing flux from welded seams on opposite sides of a chassis frame.

In the copending application of Werner G. Hess, Serial No. 229,634, filed June 2, 1951, and assigned to the assignee of the present invention, a machine is illustrated, described and claimed, which welds the seam on opposite sides of a box section structure formed of telescoped channel rail elements. These welds are performed simultaneously and automatically by a submerged arc which leaves a hard flux surface on the weld. It has been the practice to hammer the welds in order to break the layer of flux therefrom. This manual operation often damaged the welds and dented the metal because of the severe blows which had to be struck in order to remove the flux therefrom.

The present invention pertains to the use of a plurality of spring fingers on opposite sides of a slot the length of the chassis frame rails which engage the layer of flux when the chassis frame rails are forced downwardly past the fingers to remove the flux without any damage to the rail and saving substantial time and cost through the elimination of the manual operation.

Accordingly, the main objects of the invention are: to provide pressure means for engaging the flux adhering to a weld on a workpiece as the workpiece is forced thereby; to provide a table having advancing means for moving workpieces to a pressure element which forces the workpiece past spring fingers for removing the flux which adhered to a welded seam thereon; to provide a table having advancing means for moving chassis rails toward a pressure member and for accurately locating the chassis rails during the retractive movement of the member and by forcing the rails through a slot the shape of the chassis rail having spring fingers at the edges, scrape the flux from the welded seams at opposite sides of the rail, and, in general, to provide a flux removing device which is simple in construction, positive in operation and economical of manufacture.

Other objects and features of novelty of the invention will be specifically pointed out or will become apparent when referring, for a better understanding of the invention, to the following description, taken in conjunction with the accompanying drawings, wherein:

Figure 1 is a broken left-hand view in elevation of a machine for removing flux from opposite seams of a chassis rail embodying features of the present invention;

Fig. 2 is a view showing the right-hand portion of the structure illustrated in Fig. 1;

Fig. 3 is a sectional view of the structure illustrated in Fig. 1, taken on the line 3—3 thereof;

Fig. 4 is a sectional view of the structure illustrated in Fig. 2, taken on the line 4—4 thereof;

Fig. 5 is a side view of the structure illustrated in Fig. 2;

Fig. 6 is an enlarged sectional view of the structure illustrated in Fig. 3, taken on the line 6—6 thereof;

Fig. 7 is an enlarged sectional view of the structure illustrated in Fig. 1, taken on the line 7—7 thereof;

Fig. 8 is an enlarged broken view of the structure illustrated in Fig. 5, as viewed within the circle 8;

Fig. 9 is an enlarged sectional view of the structure illustrated in Fig. 7, taken on the line 9—9 thereof;

Fig. 10 is an enlarged view of the structure illustrated in Fig. 8, as viewed from line 10—10 thereof;

Fig. 11 is a broken plan view of the structure illustrated in Fig. 7;

Fig. 12 is a view of structure, similar to that illustrated in Fig. 1, showing a further form which it may assume; and Fig. 13 is a side view of the structure illustrated in Fig. 12.

Referring to Figs. 1 to 11, the device of the present invention comprises a bed 15 supported on channel leg elements 16 and 17, the leg element 17 having inwardly directed longitudinal channels 18 mounted thereon in position to receive rollers 19 mounted on a carriage 21. Side members 22 on the carriage have spaced pivoted fingers 23 thereon, the heavy rear end of which abut against a stop bar 24 which positions the finger to engage a rail when the carriage is advanced. The angular supporting members 17 carrying a bar 25 on which fingers 26, similar to the fingers 23, are mounted for swinging movement, the rearward heavy ends of which are limited in downward movement by the adjacent stop bars 24. Centrally between the side members 22, an angular support 27 is provided connected by supports 28 to an angle member 29. The chassis frame rests upon the bars 25 and the central support 27 in position to be advanced therealong. Beneath the central support 27 a cylinder 31 is mounted, having a piston rod 32 connected to centrally disposed, downwardly projecting plates 33 on the carriage. When the cylinder is energized to retract the rod, the carriage 21 is advanced to have the fingers 23 thereon engage a chassis rail and move it forwardly beyond the fingers 26 on the bars 25. Upon the extension of the piston rod, the carriage 21 is retracted, the fingers which carried the chassis rails therewith pivoting downwardly and passing beneath the chassis rails in position to engage the next succeeding rail delivered to the bars 25.

As is evident from Fig. 5, the rails delivered from the welding machine 34 will pass along the downwardly sloping carrier 35 having a plurality of rollers 36 thereon. At the end of the advancing movement, the rail will be in a position to be engaged by the rearmost set of fingers 23 of the carriage. In this manner the rails are moved upwardly along the bars 25 and central support 27 to eventually be delivered to the angle brackets 37 mounted on a carriage 38.

The carriage 38 is supported above the machine in suitable guides and operated by a cylinder 39 having its upper end supported on the top channel members 41 of the machine by a pivot 42. The carriage 38 comprises an I-beam 43 having upright bars 44 at each end to which outwardly projecting channel elements 45 are secured. The channel elements extend over the angle members 46, extending downwardly from the top channel members 41, reinforced by an angularly disposed angle member 47.

The bars 44 are braced by angle members 48 connected to a plate 49 on the central part of the I-beam 43 to which the piston rod 51 of the cylinder 39 is secured by a pivot 52. The I-beam 43 has a plurality of push elements 53 of a length to engage adjacent portions of the chassis rail when supported in the pair of angle brackets 37 to which the rail was delivered by the carriage, as pointed out hereinabove.

As the rail 54 is moved onto the brackets 37, clamping fingers 55 mounted on pivots 57 are raised as the cam surface 56 thereof is engaged by the rail, after which the fingers will drop downwardly, as illustrated in Figs. 5 and 8, to retain the rail on the brackets. Each of the brackets 37 is secured on a plate 58 by a pivot 59 and an arm 61 on the bracket 37 is secured by a pivot 62 to a piston rod 63 of a cylinder 64 which is mounted on a pivot 65 on the upper end of the plate 58. After the rail 54 has been clamped within the brackets 37, the carriage 38 is moved downwardly through the actuation of the piston within the cylinder 39, extending the piston rod 51 and causing the carriage to move downwardly as a unit, carrying the rail 54 downwardly therewith due to the engagement of the push elements 53 therewith. After the carriage has been moved a desired distance, the cylinders 64 have the delivered fluid reversed to retract the piston and rod 63 to thereby swing the brackets 37 outwardly to release the rail 54 and permitting it to drop upon angularly disposed bars 66 from which the rail will slide onto a conveyer 67. Thereafter, the rod 51 is retracted within the cylinder 39 and the rod 63 is extended to swing the brackets 37 outwardly so that as the carriage 38 is raised, the brackets 37 will be in a position to receive the next adjacent rail which is advanced thereto upon the movement of the carriage upon actuation of the rod 32 of the cylinder 31. The carriage has sheaves 68 mounted adjacent to each of the supporting bars 44 over which cables 69 extend, having one end 71 fastened to the top channel member 41 and the opposite end 72 secured to the supporting bar 44. The cables maintain the carriage 38 squared with the frame in all positions of its movement.

Channel members 73 have a plate 74 supported thereon and similar channel members 75 aligned therewith support a plate 76 in a manner to provide a slot 77 with the plate 74 the shape of the chassis frame. The under sides of the plates adjacent the slot, as illustrated more specifically in Figs. 3, 4 and 6, are provided with a plurality of spring fingers 78, secured by bars 79 and bolts 81 to the under side of the surface in alignment against a bar 82. A rod 83 may be welded or otherwise secured to the under side of the plate adjacent to the edges forming the slot for positioning the end of the finger outwardly thereof within the slot. The spring fingers are provided in groups so as to be located at the points along the rail which have been welded so as to engage the side surfaces of the rail and thereby scrape across the welds and break and remove the flux adhering thereto. The flux, when broken from the weld, will drop into the hopper 84 and slide into the trough 85 from which it will be advanced by a conveying element 86 to a reclaiming device.

A further form of the invention is illustrated in Figs. 12 and 13, wherein a carriage 87 mounted on rollers 88, has pivoted fingers 89 mounted thereon which engage and advance the rail along supporting members. The central portion of the carriage has a finger 91 secured on angle-shaped uprights 92 on a pivot 93. The fingers 89 advance the rails 54 to the right, as illustrated in Fig. 13, and upon completing the movement the carriage is returned. Before the end of the return movement is reached the central fingers 91 have the cam surface 94 thereof riding over the cam block 95 and swing upwardly to be in a position to engage the forward side of the rails and move the rails during the final return movement of the carriage, to thereby accurately locate the rail. Thereupon a tongue mechanism 96 is moved downwardly to engage the rail through the movement of the carriage 38 which may thereafter be raised and shifted to a position of alignment with the aperture 77 and be moved downwardly to push the rail therethrough and have the flux removed from the weld as pointed out above. Otherwise, the mechanism is the same as that described with regard to Figures 1 to 11.

What is claimed is:

1. A device for removing flux from a welded seam on opposite sides of a chassis frame, including, in combination, a carriage disposed above a bed having a slot, a plurality of spring fingers supported by the bed and extending into the slot along both edges thereof, means on said carriage for supporting a rail accurately located above the slot, and means for moving said carriage downwardly and forcing said rail through said slot and past said fingers which scrape the flux from the welded seams.

2. A device for removing flux from a welded seam on opposite sides of a chassis frame, including, in combination, a carriage disposed above a slot, a bed having a plurality of spring fingers supported by the bed and extending into the slot along both edges thereof, means on said carriage for supporting a rail accurately located above the slot, means for moving said carriage downwardly and forcing said rail through said slot and past said fingers which scrape the flux from the welded seams, means for releasing said rail after passing beyond the fingers, and means for raising said carriage to receiving position.

3. A device for removing flux from a welded seam on opposite sides of a chassis frame, including, in combination, a carriage disposed above a bed having a slot, a plurality of spring fingers supported by the bed and extending into the slot along both edges thereof, means on said carriage for supporting a rail accurately located above the slot, means for moving said carriage downwardly and forcing said rail through said slot and past said fingers which scrape the flux from the welded seams, means for releasing said rail after passing beyond the fingers, means for raising said carriage to receiving position, and a hopper beneath said slot and fingers for receiving said flux scraped from the welds of the rails.

4. A device for removing flux from a welded seam on opposite sides of a chassis frame, including, in combination, a carriage disposed above a slot, a bed having a plurality of spring fingers supported by the bed and extending into the slot along both edges thereof, means on said carriage for supporting a rail accurately located above the slot, means for moving said carriage downwardly and forcing said rail through said slot and past said fingers which scrape the flux from the welded seams, means for releasing said rail after passing beyond the fingers, means for raising said carriage to receiving position, a hopper beneath said slot and fingers for receiving said flux scraped from the welds of the rails, and sloping bars above said hopper and beneath said slot and fingers for receiving said rail and for directing it beyond the hopper.

5. In a device for removing flux from welded seams on opposite sides of a chassis rail, a carriage, conveying means for advancing a rail to the carriage, a table having a slot, a plurality of spring fingers mounted on the table and extending into the slot with the ends forming a slot substantially the same shape as the rail but of less width than the rail, means on said carriage for receiving and supporting a rail, and means for moving said carriage for forcing the rail through said slot beyond said fingers which scrape the flux from the welded seams thereof.

6. In a device for removing flux from welded seams on opposite sides of a chassis rail, a carriage, conveying means for advancing a rail to the carriage, a table having a slot, a plurality of spring fingers mounted on the table and extending into the slot with the ends forming a slot substantially the same shape as the rail but of less width than the rail, means on said carriage for receiving and supporting a rail, means for moving said carriage for forcing the rail through said slot beyond said fingers which scrape the flux from the welded seams thereof, means for releasing said rail after passing beyond said fingers, and means for returning said carriage to its initial position.

References Cited in the file of this patent

UNITED STATES PATENTS

| | | |
|---|---|---|
| 1,019,497 | Lehberger | Mar. 5, 1912 |
| 1,776,739 | O'Brien | Sept. 23, 1930 |
| 1,881,354 | Everett | Oct. 4, 1932 |
| 2,306,922 | Willard | Dec. 29, 1942 |
| 2,523,968 | Paulson | Sept. 26, 1950 |

UNITED STATES PATENT OFFICE

CERTIFICATE OF CORRECTION

Patent No. 2,740,978 April 10, 1956

Werner G. Hess

It is hereby certified that error appears in the printed specification of the above numbered patent requiring correction and that the said Letters Patent should read as corrected below.

Column 4, line 23, claim 2, and line 48, claim 4, for "slot, a bed having", each occurrence, read -- bed having a slot, --.

Signed and sealed this 5th day of June 1956.

(SEAL)
Attest:

KARL H. AXLINE
Attesting Officer

ROBERT C. WATSON
Commissioner of Patents